(12) United States Patent
Huang et al.

(10) Patent No.: US 8,861,238 B2
(45) Date of Patent: Oct. 14, 2014

(54) ISOLATED SOFT-SWITCH SINGLE-STAGE AC-DC CONVERTER

(75) Inventors: Qin Huang, Cary, NC (US); Yu Du, Raleigh, NC (US); Wenxi Yao, Raleigh, NC (US)

(73) Assignee: North Carolina State University, Raleigh, NC (US)

( * ) Notice: Subject to any disclaimer, the term of this patent is extended or adjusted under 35 U.S.C. 154(b) by 0 days.

(21) Appl. No.: 13/595,883

(22) Filed: Aug. 27, 2012

(65) Prior Publication Data

US 2013/0051102 A1 Feb. 28, 2013

Related U.S. Application Data

(60) Provisional application No. 61/527,411, filed on Aug. 25, 2011.

(51) Int. Cl.
H02M 7/217 (2006.01)

(52) U.S. Cl.
CPC .................................... *H02M 7/217* (2013.01)
USPC ....................................................... 363/127

(58) Field of Classification Search
CPC .... Y02B 70/126; H02M 7/1557; H02M 1/32; H02M 3/33592; H02M 7/1555; G05F 1/33
USPC ............. 363/44, 81, 84, 85, 89, 90, 125, 127, 363/128
See application file for complete search history.

(56) References Cited

U.S. PATENT DOCUMENTS

| | | | | |
|---|---|---|---|---|
| 5,705,923 | A * | 1/1998 | Johnston et al. | 323/328 |
| 6,067,243 | A * | 5/2000 | Suzuki et al. | 363/132 |
| 6,118,673 | A * | 9/2000 | Hua | 363/56.11 |
| 6,366,474 | B1 * | 4/2002 | Gucyski | 363/20 |
| 6,606,257 | B2 * | 8/2003 | Bourdillon | 363/21.12 |
| 6,784,644 | B2 * | 8/2004 | Xu et al. | 323/225 |
| 7,164,589 | B1 * | 1/2007 | Soldano et al. | 363/21.04 |
| 2008/0130339 | A1 * | 6/2008 | McDonald et al. | 363/127 |
| 2009/0040800 | A1 * | 2/2009 | Sonnaillon et al. | 363/89 |
| 2011/0031927 | A1 * | 2/2011 | Kajouke et al. | 363/13 |
| 2011/0115285 | A1 * | 5/2011 | Ransom et al. | 363/132 |
| 2011/0149610 | A1 * | 6/2011 | Moussaoui et al. | 363/21.04 |

OTHER PUBLICATIONS

Falcones S., Mao X., Ayyanar R.; Topology Comparison for Solid State Transformer Implementation; Jul. 2010; IEEE, pp. 1-8.
Conference Paper from Nov. 15, 2010 conference held at the FREEDM Systems Center, NCSU, Transformer-Isolated Soft-switched Single-stage AC-DC Converter.
Related U.S. Appl. No. 13/600,280, filed Aug. 31, 2012; not yet public.
Du, Yu et al., High-frequency High-efficiency DC-DC Converter for Distributed Energy Storage Modularization, IEEE, IECON 2010 36th Annual Conference, Nov. 7-10, 2010, p. 1832-1837 and the Second FREEDM Systems annual conference, May 18-20, 2010.

* cited by examiner

*Primary Examiner* — Gary L Laxton
*Assistant Examiner* — Alex Torres-Rivera
(74) *Attorney, Agent, or Firm* — Olive Law Group, PLLC

(57) ABSTRACT

An alternating current-to-direct current (AC-DC) converter is provided. The converter may include a transformer having a primary side and a secondary side. A first bi-directional switch and a first inductor may be connected in series between a positive terminal of an AC source and a first terminal of the primary side of the transformer. A second bi-directional switch and a second inductor may be connected between the positive terminal of the AC source and a second terminal of the primary side of the transformer and connected in parallel with the first bi-directional switch.

18 Claims, 12 Drawing Sheets

ISOLATED SOFT-SWITCH SINGLE-STAGE AC-DC CONVERTER

CROSS-REFERENCE TO RELATED APPLICATIONS

This application claims priority to U.S. Provisional Application No. 61/527,411 filed on Aug. 25, 2011, the contents of which are hereby incorporated by reference in their entirety.

FEDERALLY SPONSORED RESEARCH OR DEVELOPMENT

The technology disclosed herein was made with government support under award number EEC-08212121 awarded by the ERC Program of the National Science Foundation. The United States government may have certain rights in the technology.

TECHNICAL FIELD

The present disclosure is directed towards an isolated soft-switching single-stage alternating current-to-direct current (AC-DC) converter, and more particularly towards an AC-DC converter having an isolated transformer having reduced volume and weight and improved efficiency when compared with a conventional Pulse-Width-Modulation (PWM) converter.

BACKGROUND

Conventional transformer isolated AC-DC converters generally included two power stages. This resulted in an increased volume and weight, along with decreased efficiency of the converter. These converters also generated relatively high voltage and current rates as a function of time, which may have led to high electromagnetic interference (EMI) noises.

As the use of DC powered devices has increased, so has the need to create a more efficient AC-DC converter. For example, increased production of and reliance on battery-powered vehicles has placed greater emphasis on a more efficient AC-DC converter. Battery-powered vehicles typically require AC power supplied by a grid which is then converted to DC power that is stored in the battery which powers the car. A more efficient AC-DC converter having reduced volume and weight would have significant importance to the battery-powered vehicle industry.

Additionally, AC-DC converters are useful backup battery storage for residential, commercial, and industrial uses; however, conventional AC-DC converters are bulky, expensive, and inefficient. A need therefore exists for an improved AC-DC converter that addresses these issues.

SUMMARY

This Summary is provided to introduce a selection of concepts in a simplified form that are further described below in the Detailed Description of Illustrative Embodiments. This Summary is not intended to identify key features or essential features of the claimed subject matter, nor is it intended to be used to limit the scope of the claimed subject matter.

According to one or more embodiments, an alternating current-to-direct current (AC-DC) converter. The converter may include a transformer having a primary side and a secondary side. A first bi-directional switch and a first inductor may be connected in series between a positive terminal of an AC source and a first terminal of the primary side of the transformer. A second bi-directional switch and a second inductor may be connected between the positive terminal of the AC source and a second terminal of the primary side of the transformer and connected in parallel with the first bi-directional switch.

According to one or more embodiments, the first bi-directional switch and the second bi-directional switch are insulated-gate bipolar transistor (IGBT) switches.

According to one or more embodiments, the first bi-directional switch and the second bi-directional switch are metal-oxide semiconductor field-effect transistors (MOSFETS).

According to one or more embodiments, the first bi-directional switch and the second bi-directional switch are silicon-controlled rectifier switches (SCR).

According to one or more embodiments, the transformer is a high frequency transformer. The transformer primary winding may include one of a center-tapped winding or two separate windings.

According to one or more embodiments, the converter includes a third bi-directional switch connected in series with the first bi-directional switch and the first inductor. In accordance with one or more embodiments, the converter includes a fourth bi-directional switch connected in series with the second bi-directional switch and the second inductor.

According to one or more embodiments, the converter further includes a first switch connected between a first terminal of the secondary side of the transformer and a DC source, and a second switch connected between the DC source and a second terminal of the secondary side of the transformer.

According to one or more embodiments, when the first and second bi-directional switches of the primary side turn on, the current flowing therethrough increases from zero, and when the first and second two bi-directional switches of the primary side turn off, the current has been decreased to zero.

According to one or more embodiments, a method of transmission in a bi-directional AC-DC converter having a bi-directional power stage that processes energy from an AC utility power grid to a passive DC load is provided. The power stage includes a first bi-directional switch and a second bi-directional switch on a primary side of a transformer. The method includes controlling at least one of the first bi-directional switch and the second bi-directional switch when the current on the primary side is about zero.

According to one or more embodiments, the power stage further includes a third bi-directional switch connected in series with the first bi-directional switch and a first inductor and a fourth bi-directional switch connected in series with the second bi-directional switch and a second inductor.

According to one or more embodiments, the secondary side of the transformer includes a first switch connected between a first terminal of the secondary side of the transformer and a DC source, and a second switch connected between the DC source and a second terminal of the secondary side of the transformer.

According to one or more embodiments, a bi-directional alternating current-to-direct current (AC-DC) converter is provided. The converter includes a bi-directional power stage that processes energy from an AC utility power grid to a passive DC load. The power stage includes an input filter inductor and at least two bi-directional switches on a primary side of a transformer.

According to one or more embodiments, the power stage includes at least two bi-directional switches on a secondary side of the transformer. According to one or more embodiments, each of the at least two bi-directional switches are at least one of an insulated-gate bipolar transistor (IGBT), MOSFET, and SCR.

According to one or more embodiments, each of the at least two bi-directional switches comprise at least one of a metal-oxide-semiconductor field-effect transistor (MOSFET), IGBT, and SCR.

According to one or more embodiments, when the at least two bi-directional switches of the primary side turn on, the current flowing therethrough increases from zero, and when the at least two bi-directional switches of the primary side turn off, the current has been decreased to zero.

According to one or more embodiments, a bi-directional alternating current-to-direct current (AC-DC) converter is provided. The AC-DC converter may include a bi-directional power stage that processes energy from an AC utility power grid to a passive DC load. The power stage may be connected to the grid through an additional LC filter. The power stage may include an input filter inductor and at least two bi-directional switches on a primary side of a transformer.

According to one or more embodiments, each of the at least two bi-directional switches, which may be four-quadrant switches, include at least one insulated-gate bipolar transistor (IGBT). In accordance with one or more embodiments, each of the at least two bi-directional switches includes at least one metal-oxide-semiconductor field-effect transistor (MOSFET).

According to one or more embodiments, the input filter inductor is configured to utilize transformer leakage.

According to one or more embodiments, current is regulated on the primary side and voltage is regulated on the secondary side.

According to one or more embodiments, the at least two bi-directional switches of the primary side turn on, the current flowing therethrough increases from zero, and when the at least two bi-directional switches of the primary side turn off, the current has been decreased to zero.

According to one or more embodiments, the passive DC load includes a battery for powering an electric vehicle. The AC-DC converter may be installed within the electric vehicle.

According to one or more embodiments, a method of transmission in a bi-directional AC-DC converter is provided. The converter is of the type having a bi-directional power stage that processes energy from an AC utility power grid to a passive DC load. The power stage includes an input filter inductor and at least two bi-directional switches on a primary side of a transformer. The method includes the step of controlling at least one of the at least two bi-directional switches on a primary side of a transformer when the current on the primary side is about zero.

According to one or more embodiments, an alternating current-to-direct current (AC-DC) converter is provided. The converter includes a transformer having a primary side and a secondary side, a first bi-directional switch and a first inductor connected in series between a positive terminal of an AC source and a first terminal of the primary side of the transformer, a second bi-directional switch and a second inductor connected between the positive terminal of the AC source and a second terminal of the primary side of the transformer and connected in parallel with the first bi-directional switch, a third bi-directional switch and a third inductor connected in series between the first bi-directional switch and the first terminal, and a fourth bi-directional switch and a fourth inductor connected in series between the second bi-directional switch and the second terminal.

According to one or more embodiments, an AC-DC converter is provided. The converter includes a transformer having a primary side and a secondary side, a first bi-directional switch and a first inductor connected in series between a positive terminal of an AC source and a first terminal of the primary side of the transformer, and a second bi-directional switch and a second inductor connected between the positive terminal of the AC source and a second terminal of the primary side of the transformer and connected in parallel with the first bi-directional switch.

According to one or more embodiments, an alternating current-to-direct current (AC-DC) converter is provided. The converter includes a transformer having a primary side and a secondary side, a first bi-directional switch connected in series between a positive terminal of an AC source and a first terminal of the primary side of the transformer, a second bi-directional switch connected between the positive terminal of the AC source and a second terminal of the primary side of the transformer and connected in parallel with the first bi-directional switch, a third bi-directional switch connected in parallel with the first bi-directional switch and the first terminal, and a fourth bi-directional switch connected in parallel with the second bi-directional switch and the second terminal. A first inductor is connected in series between the first and third bi-directional switch and the first terminal of the transformer.

BRIEF DESCRIPTION OF THE DRAWINGS

The foregoing summary, as well as the following detailed description of preferred embodiments, is better understood when read in conjunction with the appended drawings. For the purposes of illustration, there is shown in the drawings exemplary embodiments; however, the presently disclosed invention is not limited to the specific methods and instrumentalities disclosed. In the drawings.

DETAILED DESCRIPTION

Figure 1:
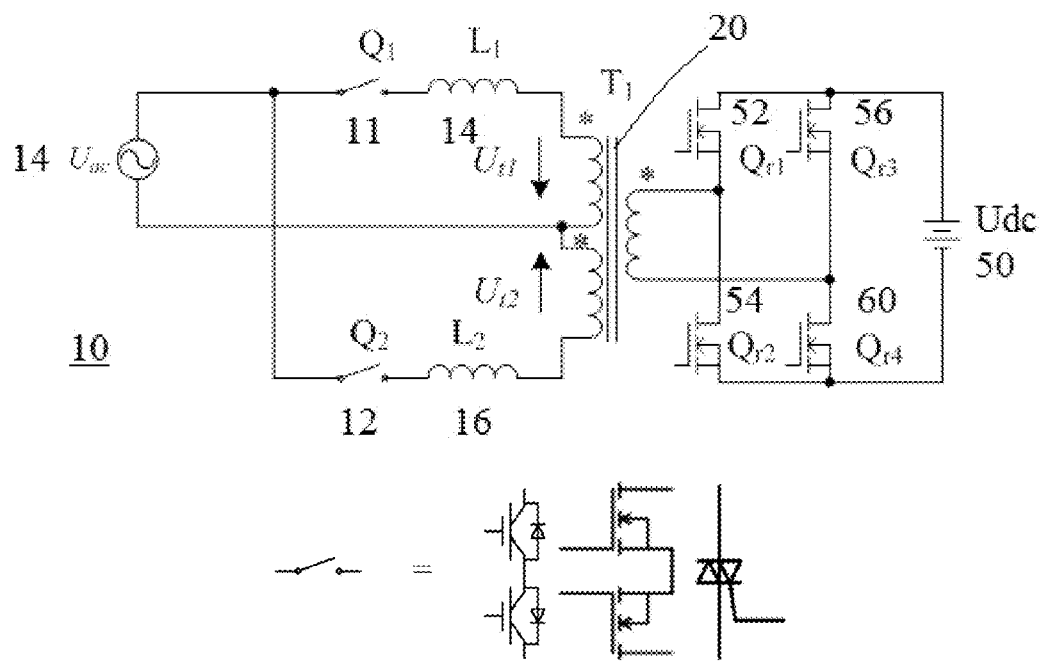
FIG. 1 illustrates a transformer isolated AC-DC converter according to one or more embodiments disclosed herein.

While the disclosure of the technology herein is presented with sufficient details to enable one skilled in this art to practice the invention, it is not intended to limit the scope of the disclosed technology. The inventors contemplate that future technologies may facilitate additional embodiments of the presently disclosed subject matter as claimed herein. Moreover, although the term "step" may be used herein to connote different aspects of methods employed, the term should not be interpreted as implying any particular order among or between various steps herein disclosed unless and except when the order of individual steps is explicitly described.

Disclosed herein are one or more embodiments for a transformer-isolated soft-switching single-stage alternating current-to-direct current (AC-DC) converter. For single-phase AC-DC conversation, one or more embodiments may include an input stage, a high frequency transformer, and an output stage. The input stage may be built from one or more topological structures disclosed herein. In one or more embodiments of the basic structures, a first series branch includes one or more of a power semiconductor switch, an inductor, and a capacitor. A second series resonant branch includes one or more semiconductor switches and one or more inductors. The one or more inductors in the second series resonant branch may utilize the high frequency transformer leakage inductance and be integrated into the transformer.

Conventional transformer isolated AC-DC converters generally include two power stages: a front hard-switched PWM AC-DC rectifier and a soft-switched DC-DC converter with transformer. This two-stage design increases the volume weight and cost of the converter because the circuit includes more semiconductor power devices, an intermediate DC-link capacitor bank with large capacitance, and a large heat sink due to more thermal loss at hard switching conditions. The converter power efficiency is also low as a result of hard switching and two power stages. For utility applications, switches in conventional PWM rectifier encounter high voltage stress and extremely high dv/dt. This significantly limits the power conversion efficiency and power density of the converter and generates severe EMI issues as well.

In the one or more converters disclosed herein, there is no intermediate DC link and therefore the large DC-link capacitor is eliminated. The input of the topologies may be bridgeless and as few as two switches may be used to interface AC input. The one or more converters include a direct AC-DC power conversion stage. The power semiconductor devices are switched at soft switching conditions in full load range and the switching loss are minimized, which improves the converter efficiency. It also contains a high frequency transformer which can provide both galvanic isolation and high voltage gain. Inefficiencies such as high dv/dt, di/dt, and electromagnetic noises in conventional PWM converter are addressed by the resonance nature of the inverted converter. In another embodiment of the power converter, the high frequency transformer can be removed for the applications where galvanic isolate or high voltage gain is not required.

A circuit diagram for an AC-DC converter according to one or more embodiments is illustrated in FIG. 1. Using the AC-DC converter of FIG. 1, the energy can be controlled to flow from AC source to DC source or from DC source to AC source. As illustrated, the AC-DC converter, generally designated 10, may include a first switch 11 (Q1) and an inductor 14 (L1) in series connection therewith between an AC source 14 (Uac) and a transformer 20 (T1). A second switch 12 (Q2) and a second inductor 16 (L2) may be provided in parallel connection with the first switch 11 (Q1). On the secondary side of the transformer 20 (T1), there may be switches 52 (Qr1), 54 (Qr2), 56 (Qr3), and 60 (Qr4) and a DC source 50 (Udc). Each of switch 11 (Q1), switch 12 (Q2), switch 52 (Qr1), switch 54 (Qr2), switch 56 (Qr3), and switch 60 (Qr4) may be bi-directional switches. IGBTs may be used for switch 11 (Q1) and switch 12 (Q2) as is further illustrated in FIG. 2. The one or more converters may be worked in a discontinuous current mode (DCM). According, the one or more converters are configured such that when the switches of the primary side turn on, the current increases from zero, and when the switches turn off, the current has been decreased to zero. The switching may be very soft, meaning it occurs at low voltages and currents.

Figure 2:
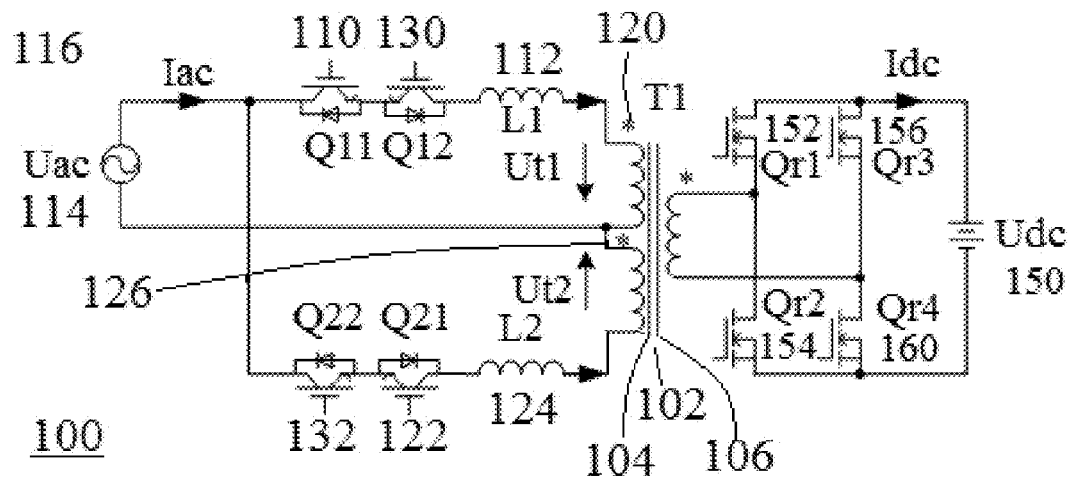
FIG. 2 illustrates a transformer isolated AC-DC converter employing an IGBT switch according to one or more embodiments disclosed herein.

An alternating current-to-direct current (AC-DC) converter is illustrated in FIG. 2 and generally designated 100. The converter 100 includes a transformer 102 (T1) having a primary side 104 and a secondary side 106. The transformer primary winding may be one of a center-tapped winding or two separate windings. The transformer 102 (T1) may be a high frequency transformer. A first bi-directional switch 110 (Q11) and a first inductor 112 (L1) are connected in series between a positive terminal 116 of an AC source 114 (Uac) and a first terminal 120 of the primary side of the transformer 104 (T1). The AC source 114 (Uac) may be a residential or commercial wall outlet, such as, for example, a 110 volt or 200 volt wall outlet.

A second bi-directional switch 122 (Q21) and a second inductor 124 (L2) may be connected between the positive terminal 116 of the AC source 114 (Uac) and a second terminal 126 of the primary side 104 of the transformer 102 (T1) and connected in parallel with the first bi-directional switch 110. Each of the switches 110 (Q11) and 122 (Q21) may be any appropriately configured switch, including, an insulated-gate bipolar transistor (IGBT), which in one or more embodiments may be metal-oxide-semiconductor field-effect transistor (MOSFETS).

A third bi-directional switch 130 (Q12) may be provided in series with first bi-directional switch 110 (Q11) and be positioned between switch 110 (Q11) and the first inductor 112 (L1). Similarly, a fourth bi-directional switch 132 (Q22) may be provided in series with second bi-directional switch 122 (Q21) and be positioned between switch 122 (Q21) and the second inductor 124 (L2). Each of the switches 130 (Q12) and 132 (Q22) may be any appropriately configured switch, including, an insulated-gate bipolar transistor (IGBT), which in one or more embodiments may be metal-oxide-semiconductor field-effect transistor (MOSFETS). Each of the first inductor 112 (L1) and the second inductor 124 (L2) may be provided to utilize transformer leakage.

On the secondary side 106 of the transformer 102 (T1), the AC-DC converter 100 may include a first switch 152 (Qr1), a second switch 154 (Qr2), a third switch 156 (Qr3) in parallel with the first switch 152 (Qr1), and a fourth switch 160 (Qr4). Each of switches 152, 154, 156, and 160 may be a metal-oxide-semiconductor field-effect transistor (MOSFET). A DC source 150 (Udc) may be provided about which current Idc flows from the transformer 102 (T1). The DC source 150 (Udc) may be a battery or the like. This portion of the AC-DC converter 100 may include any combination of the switches, including only the first switch 152 (Qr1) and the second switch 154 (Qr2).

The secondary side of the transformer 102 (T1) may include a first switch 152 (Qr1) connected between a first terminal of the secondary side of the transformer 102 (T1) and a DC source 150 (Udc). A second switch 154 (Qr2) may be provided between the DC source 150 (Udc) and a second terminal of the secondary side of the transformer 102 (T1). A third switch 156 (Qr3) may be provide in parallel with the first switch 152 (Qr1). A fourth switch 160 (Qr4) may be provided in parallel with the second switch 154 (Qr2)

Figure 3:
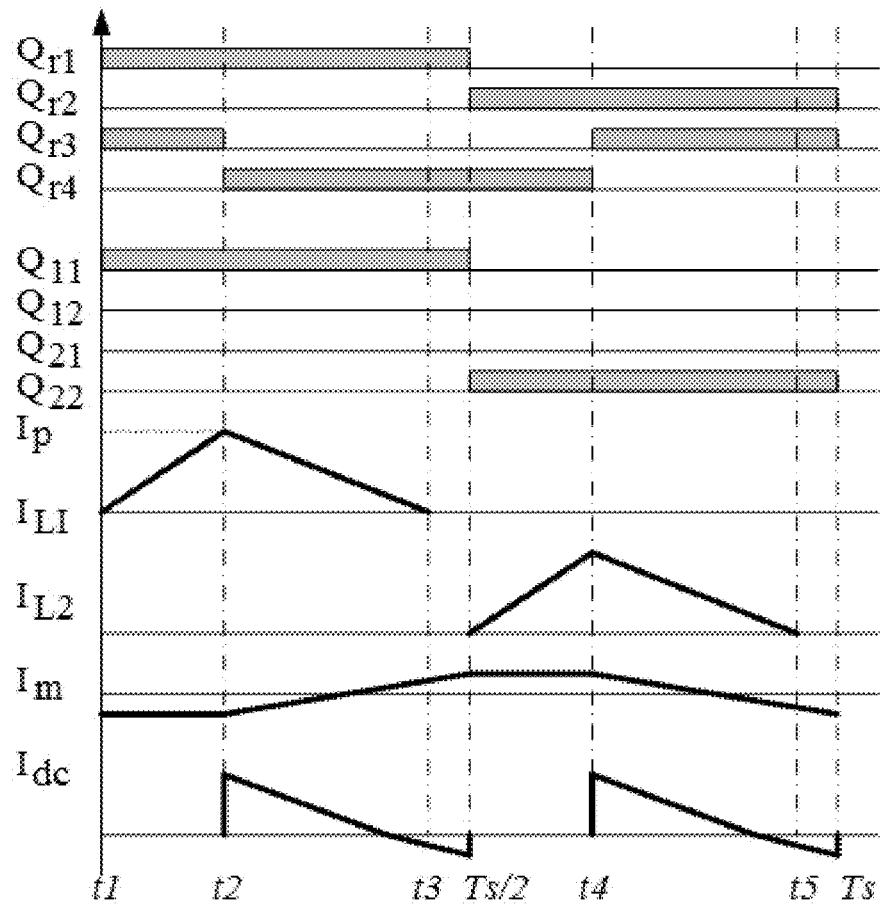
FIG. 3 is a chart illustrating the waveform characteristics of the AC-DC converter according to one or more embodiments illustrated in FIG. 2.

As an example, in the scenario where Uac>0, the main waveform of rectifier mode is in the stable state as shown in the waveform diagram of FIG. 3, where IL1 and IL2 are the current of first inductor 112 (L1) and second inductor 124 (L2), respectively, Im is the magnetizing current, and Idc is the secondary side current. The switch frequency is much higher than the frequency of Uac, so at any switching cycle, Uac may be considered as a constant voltage source. An analysis by timing stages is illustrated in the waveform diagram of FIG. 3. Timing and operation of the one or more circuit diagrams disclosed in FIG. 2 is illustrated in FIGS. 4 through 9 in which each successive figure represents a successive time period and the bolded portion of the circuit indicates current flow.

Figure 4:
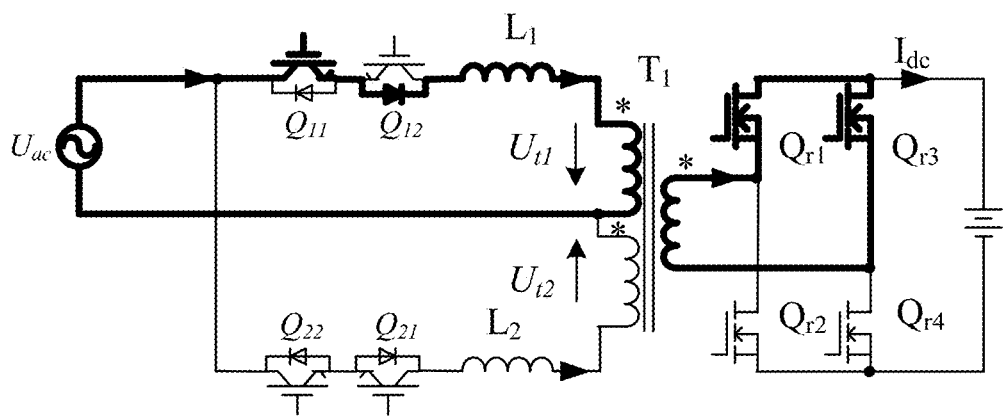
FIG. 4 illustrates current movement at a first time in the AC-DC converter according to one or more embodiments illustrated in FIG. 2.

As illustrated in FIG. 4, at time t1, the second switch 154 (Qr2) is kept turned off, and the third bi-directional switch 130 (Q12), the first switch 152 (Qr1), and the third switch 156 (Qr3) turns on. The current in the first inductor 112 (L1) increases from zero. The third bi-directional switch 130 (Q12) turns on in zero current state (ZCS) and first switch 152 (Qr1) turns on in zero voltage state (ZVS). The waveform diagram of FIG. 3 illustrates respective current flows at time 1 (t1).

Figure 5:
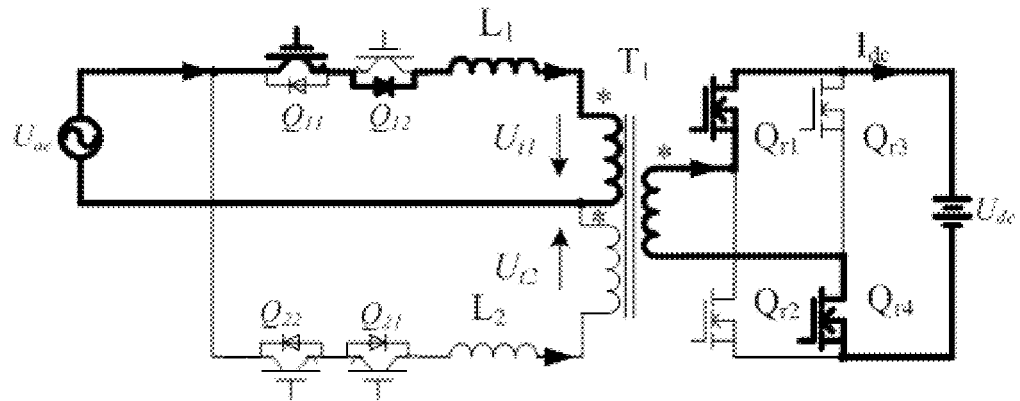
FIG. 5 illustrates current movement at a second time in the AC-DC converter according to one or more embodiments illustrated in FIG. 2.

As illustrated in FIG. 5, at time t2, the third switch 156 (Qr3) turns off, and the fourth switch 160 (Qr4) turns on. The current from the third switch 156 (Qr3) changes to the inner diode of the fourth switch 160 (Qr4). The fourth switch 160 (Qr4) turns on with ZVS. The waveform diagram of FIG. 3 illustrates respective current flows at time 2 (t2).

Figure 6:
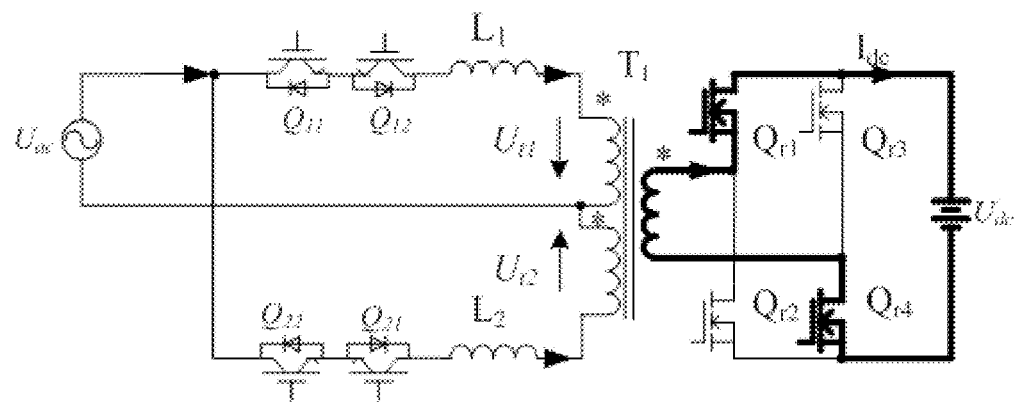
FIG. 6 illustrates current movement at a third time in the AC-DC converter according to one or more embodiments illustrated in FIG. 2.

As illustrated in FIG. 6, at time t3, the current in the primary side decreases to zero, so the third bi-directional switch 130 (Q12) turns off in ZCS. On the secondary side, the Udc provides the magnetizing current, so DC current (Idc) is negative. The waveform diagram of FIG. 3 illustrates respective current flows at time 3 (t3).

Figure 7:
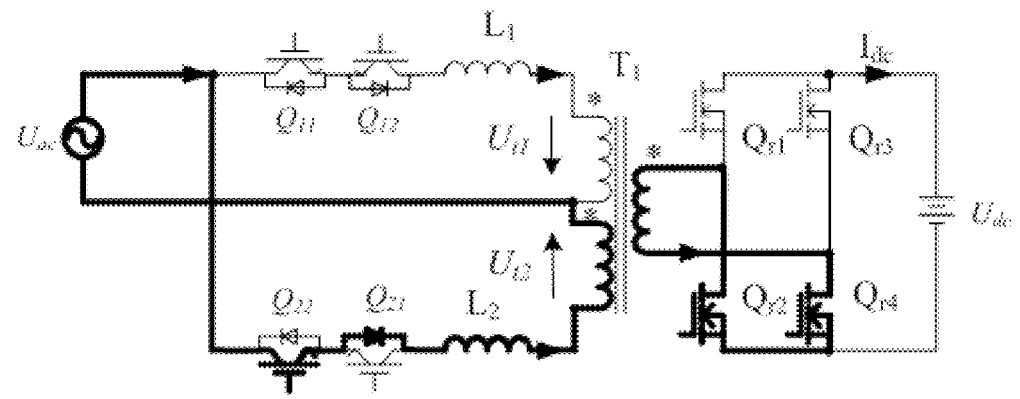
FIG. 7 illustrates current movement at a fourth time in the AC-DC converter according to one or more embodiments illustrated in FIG. 2.

As illustrated in FIG. 7, the fourth bi-directional switch 132 (Q22) turns on instead of the third bi-directional switch 130 (Q12). The second switch 154 (Qr2) and the fourth switch 160 (Qr4) turn on instead of the first switch 152 (Qr1) and the third switch 156 (Qr3). This stage is similar to the stage illustrated in FIG. 4. The waveform diagram of FIG. 3 illustrates respective current flows at time Ts/2 (Ts/2).

Figure 8:
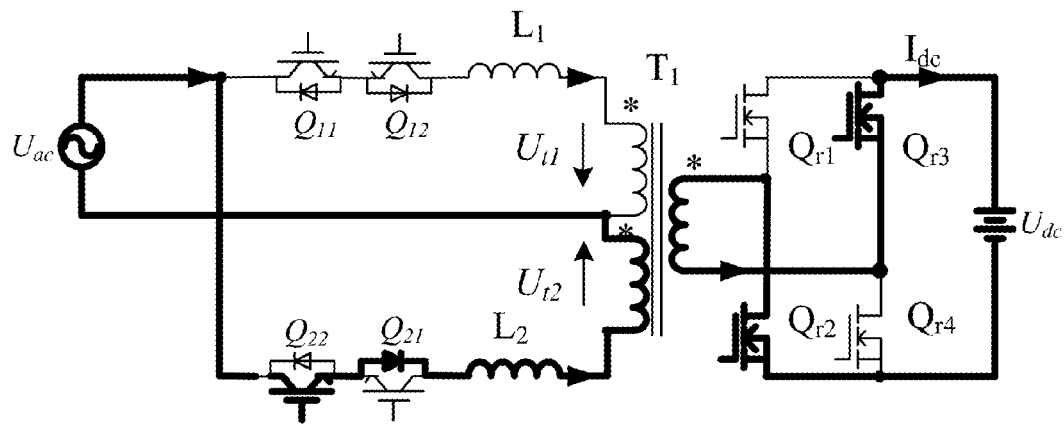
FIG. 8 illustrates current movement at a fifth time in the AC-DC converter according to one or more embodiments illustrated in FIG. 2.
Figure 9:
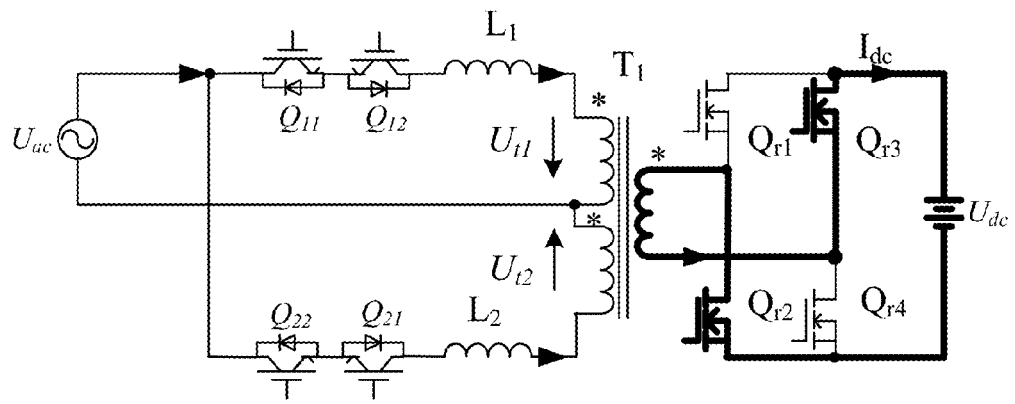
FIG. 9 illustrates current movement at a sixth time in the AC-DC converter according to one or more embodiments illustrated in FIG. 2.

As illustrated in FIG. 8, the fourth bi-directional switch 132 (Q22) turns on instead of the third bi-directional switch 130 (Q12). The second switch 154 (Qr2) and the fourth switch 160 (Qr4) are conducting current instead of the first switch 152 (Qr1) and third switch 156 (Qr3). The second switch 154 (Qr2) is turned on with ZVS.

Figure 10:
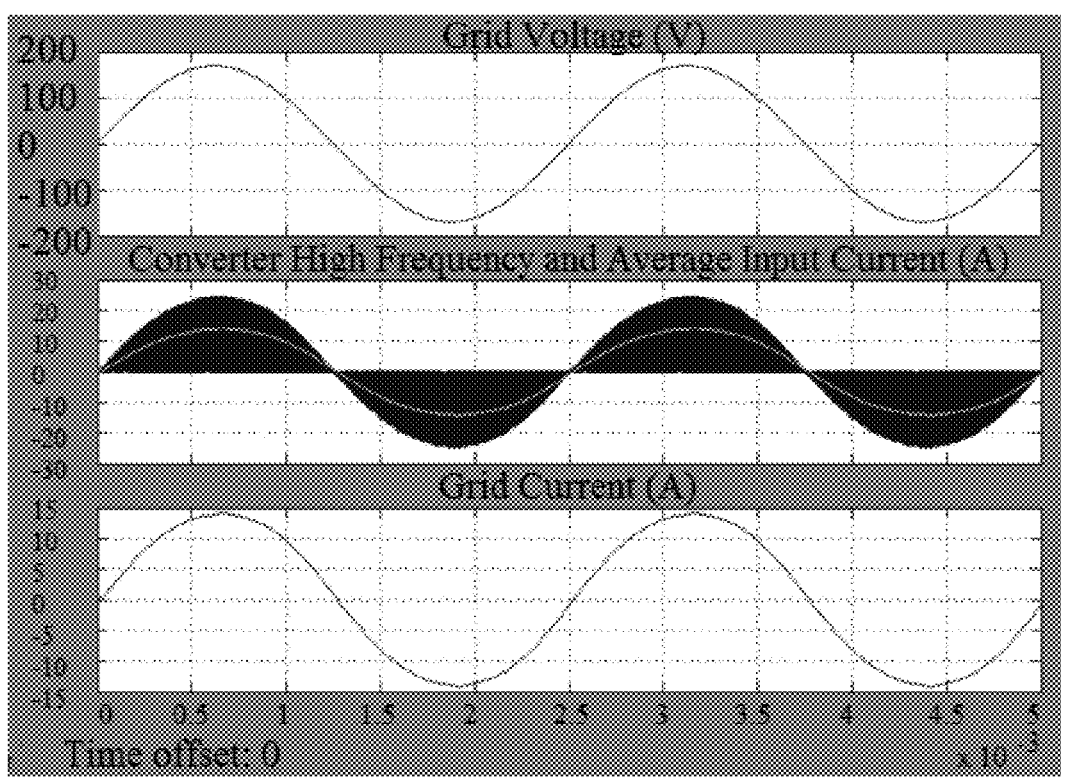
FIG. 10 illustrates the rectifier mode voltage waveform, high-frequency current waveform and its waveform for the switching-cycle average value, and the filtered low-frequency current waveform of the AC source $U_{ac}$ if a passive LC filter is connected between the AC source and the AC input terminal of the AC-DC converter according to one or more embodiments disclosed herein.

The converter 10 may also be operated in a rectifier mode. FIG. 10 illustrates the rectifier mode voltage waveform, high-frequency current waveform and its waveform for the switching-cycle average value, and the filtered low-frequency current waveform of the AC source Uac if a passive LC filter is connected between the AC source and the AC input terminal of the AC-DC converter. With the proper feedback control, the filtered low-frequency AC source current may be a sinusoidal waveform or a sinusoidal waveform with minor high-order harmonics.

Figure 11:
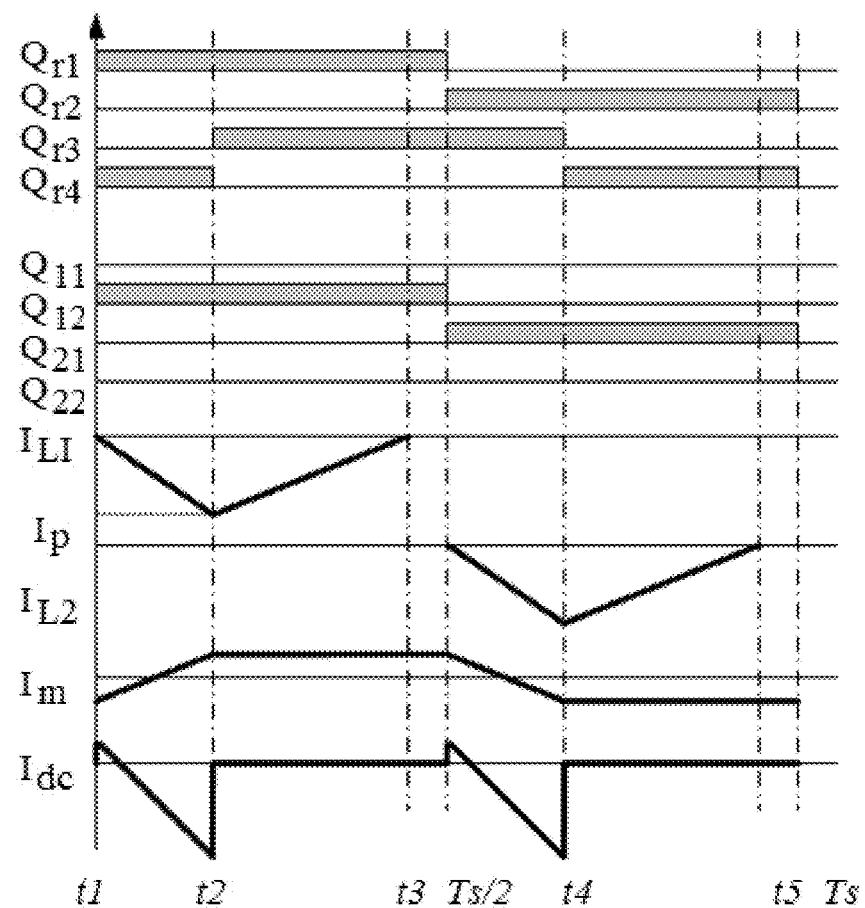
FIG. 11 is a chart illustrating the magnetizing current Im and the battery pack current Idc waveforms.

As an example, in the scenario where Uac>0, the main waveform of inverter mode is in the stable state as shown in FIG. 11, where IL1 and IL2 are the current of first inductor 112 (L1) and second inductor 124 (L2), respectively, Im is the magnetizing current, and Idc is the secondary side current. The switch frequency is much higher than the frequency of Uac, so at any switching cycle Uac may be considered as a constant voltage source. From t1 to t2, first switch 152 (Qr1), fourth switch 160 (Qr4), and first bi-directional switch 110 (Q11) are turned on. The battery pack voltage is reflected to the primary side of the transformer 102 (T1) as Ut1, which is larger than Uac. As a result, the current in first inductor 112 (L1) starts to increase but the direction of the current is reversed compared to that in rectifier mode. At t2, the third switch 156 (Qr3) is turned on with ZVS. From t2 to t3, Ut1=0 and the current in the first inductor 112 (L1) starts to decrease and reach zero at t3. From Ts/2 to t4, the second switch 154 (Qr2), the third switch 156 (Qr3), and the second bi-directional switch 122 (Q21) are turned on. The battery pack voltage is reflected to the primary side of the transformer as Ut2, which is larger than Uac. As a result, the current in the second inductor 124 (L2) starts to increase but the direction of the current is reversed compared to that in rectifier mode. At t4, the fourth switch 160 (Qr4) is turned on with ZVS. From t4 to t5, Ut2=0 and the current in the second inductor 124 (L2) starts to decrease and reach zero at t5. The corresponding magnetizing current (Im) and the battery pack current (Idc) waveforms are also shown in FIG. 11. The zero voltage switching (ZVS) of the first switch 152 (Qr1) and second switch 154 (Qr2) is obtained by the magnetizing current at the instant of being switched on. The primary side switch 130 (Q12) and second bi-directional switch 122 (Q21) are turned off with zero current switching (ZCS).

Figure 12:
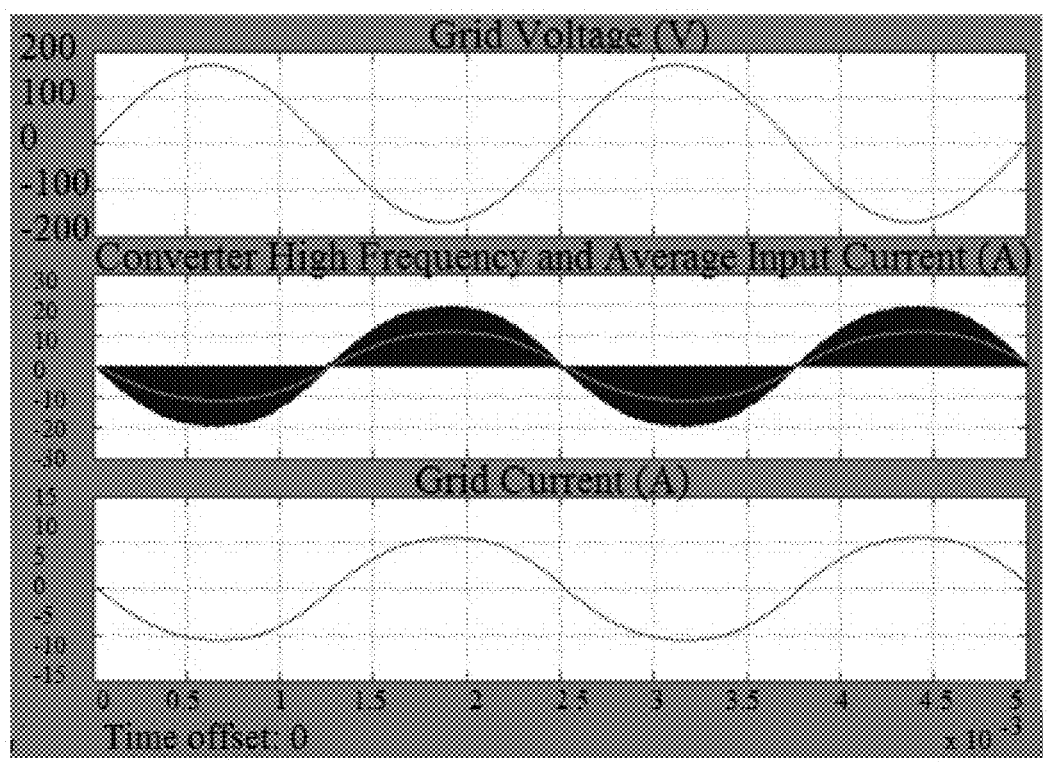
FIG. 12 illustrates the inverter mode voltage waveform, high-frequency current waveform and its waveform for the switching-cycle average value, and the filtered low-frequency current waveform of the AC source $U_{ac}$ if a passive LC filter is connected between the AC source and the AC input terminal of the AC-DC converter according to one or more embodiments disclosed herein.

FIG. 12 illustrates the inverter mode voltage waveform, high-frequency current waveform and its waveform for the switching-cycle average value, and the filtered low-frequency current waveform of the AC source Uac if a passive LC filter is connected between the AC source and the AC input terminal of the AC-DC converter. With the proper feedback control, the filtered low-frequency AC source current a sinusoidal waveform or a sinusoidal waveform with minor high-order harmonics.

Figure 13:
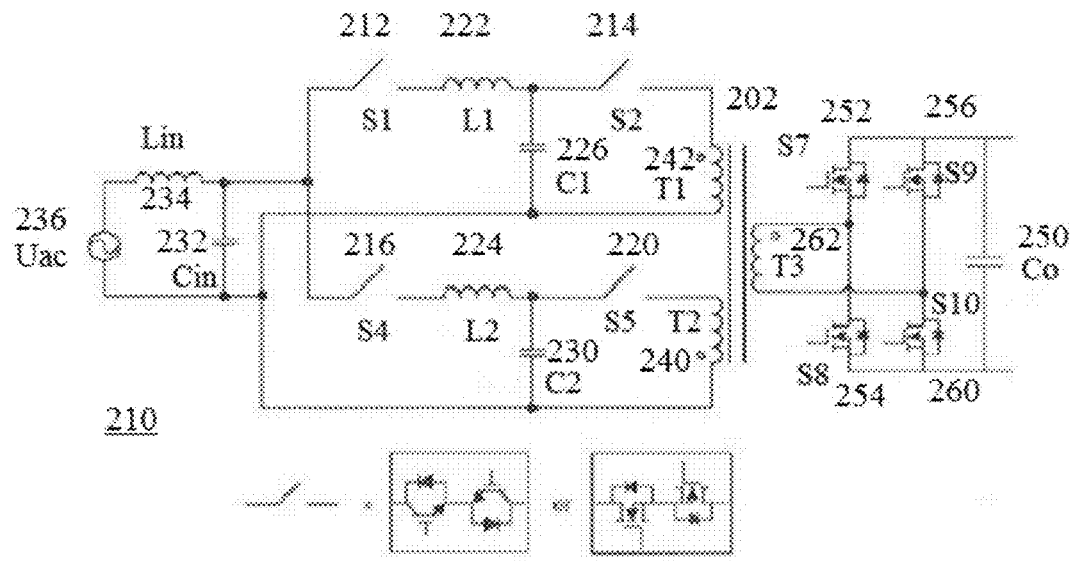
FIG. 13 illustrates one or more embodiments of a transformer isolated AC-DC converter according to one or more embodiments disclosed herein.

FIG. 13 illustrates one or more circuit diagrams disclosed herein for use as one or more AC-DC converters, generally designated 210. The one or more circuits may include switches 212 (S1), 214 (S2), 216 (S4), and 220 (S5) on the primary side of the transformer 202 (T1). Each of the switches 212 (S1), 214 (S2), 216 (S4), and 220 (S5) may be an IGBT, MOSFET, or a silicone controlled rectifier (SCR) switch. A first inductor 222 (L1) and a second inductor 224 (L2) may be provided. Inductor 222 (L1) may be in series with switch 212 (S1) and 214 (S2). Inductor 224 (L2) may be in series with switch 216 (S4) and 220 (S5). An LC filter may be provided between the AC source 236 (Uac) and the first switch 212 (S1) that includes a capacitor 232 (Cin) and inductor 234 (Lin). Inductor 226 (C1) and inductor 230 (C2) may also be provided on the primary side. The primary side transformer windings 240 (T1) and 242 (T2) may be separated about transformer 202 (T1) and connected in parallel as illustrated. On the secondary side is included a capacitor 250 (Co), a switch 252 (S7), a switch 254 (S8), a switch 256 (S9), a switch 260 (S10), and transformer winding 262 (T3). In this manner, two basic structures are paralleled in the AC side and connected to two identical primary windings of the high frequency transformer in the other side. The gate signals of corresponding switches (S1 and S4, or S2 and S5) in the two basic structures are shifted 180 degrees in order to synthesize the high frequency AC current and voltage can pass through the transformer and prevent transformer core saturation.

In one embodiment shown in FIG. 13, in each operating cycle of the rectifier mode, the first switch (S1 or S4) conducts in the first half cycle and a half-cycle series resonance is performed. At the end of the resonance, the energy is transferred from AC input to the resonant capacitor and the input switch is turned off with zero current which eliminates the switch turn-off loss. Then the second switch (S2 or S5) conducts in the second half cycle. With the coordination of semiconductor switches in the output stage, the other half-cycle series resonance is performed, which transfer the energy stored in the resonant capacitor to the DC output. At the end of the resonance, the second switch is turned off with zero current. Similar resonance operation occurs in the inverter mode, however, the second switch conducts firstly and the first switch conducts in the second half cycle in inverter mode operation. Zero current switching is obtained for the switches as well which eliminates turn-off loss.

In one or more embodiments of the converter illustrated in FIG. 13, two basic structures are paralleled in the AC side and connected to two identical primary windings of the high frequency transformer in the other side. The gate signals of corresponding switches in the two basic structures are shifted 180 degrees in order to synthesize the high frequency AC current and voltage which can pass through the transformer 202 (T1) and prevent transformer core saturation. The output stage typically consists of a full bridge with the secondary side winding of high frequency transformer 202 (T1) as the input. In one or more embodiments of the power flow control methods, the phase-shift modulation is applied to the output full bridge such that the initial capacitor voltage of resonant capacitor can be controlled and so is the magnitude of the power flow. Since there is no DC-link capacitor bank, the invented converter may be relatively compact. The energy transfer process is based on resonance such that the semiconductor power devices switch at soft conditions in full load range thus increasing the power conversion efficiency of the converter. In addition, dv/dt and di/dt in the circuit is significantly reduced and EMI issues are mitigated. The one or more converters can also be used in three-phase applications with one converter for each phase. In one or more embodiments, the switches paralleled with a capacitor are removed and the power is controlled by modulation of secondary full bridge which makes the operation of AC-DC converter simpler.

The input stage can be built from some basic topological structures. In another embodiment of the basic structures, one power semiconductor switch, one inductor and one capacitor build the first series resonant branch. The other power semiconductor switch and the other inductor build the second series resonant branch together with the same capacitor in the first series resonant branch. The inductor in the second series resonant branch can utilize the high frequency transformer leakage inductance and be integrated into the transformer. A third power semiconductor switch may be put in parallel with the resonant capacitor.

The input stage can be built from various topological structures. In one embodiment of the basic structures, one power semiconductor switch, one inductor and one capacitor build the first series resonant branch. The other power semiconductor switch and the other inductor build the second series resonant branch together with the same capacitor in the first series resonant branch. The inductor in the second series resonant branch can utilize the high frequency transformer leakage inductance and be integrated into the transformer.

In another embodiment of the power flow control methods, the turn-on and turn-off instant of the third power semiconductor switch is controlled such that the initial capacitor voltage of resonant capacitor can be controlled and so is the magnitude of the power flow.

Figure 14:
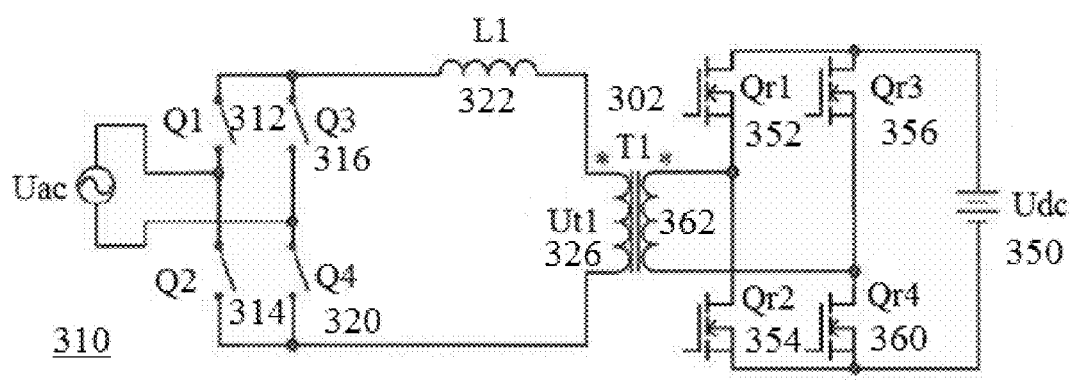
FIG. 14 illustrates one or more embodiments of a transformer isolated AC-DC converter according to one or more embodiments disclosed herein.
Figure 15:
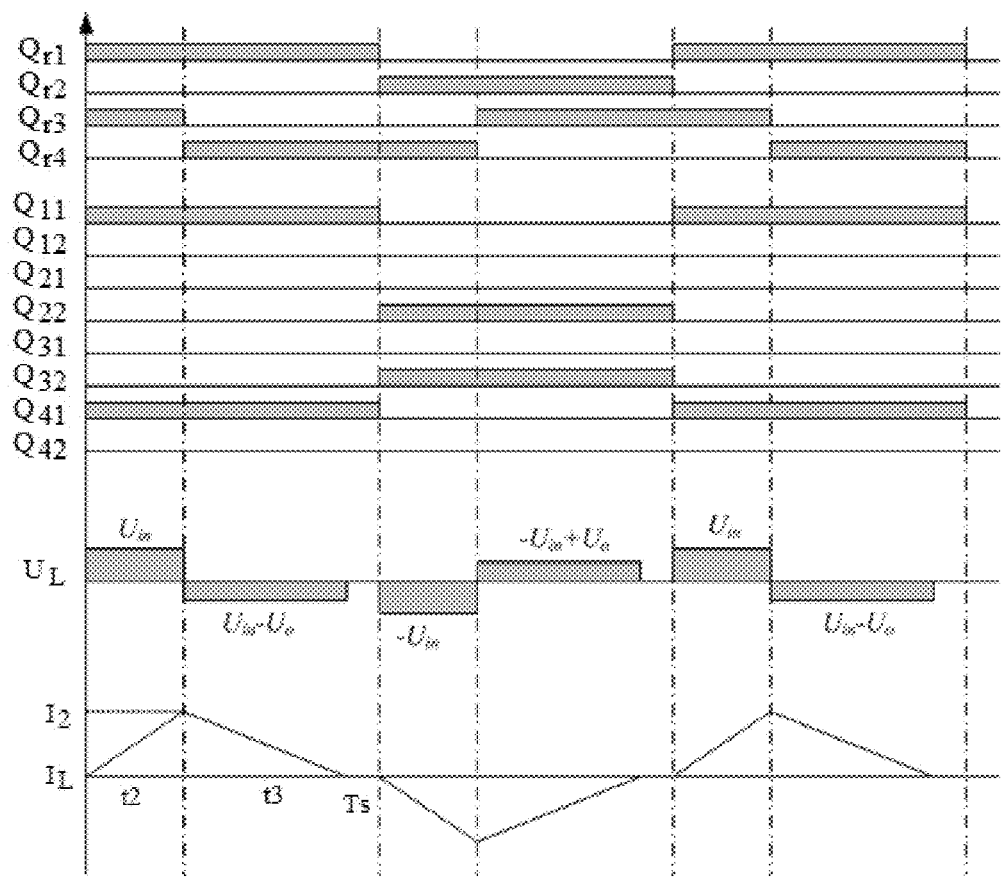
FIG. 15 is a chart illustrating the waveform characteristics of the AC-DC converter according to one or more embodiments illustrated in FIG. 14.

FIG. 14 illustrates one or more circuit diagrams disclosed herein for use as one or more AC-DC converters where the circuit is generally designated 310. The one or more circuits 310 may include switches 312 (Q1), 314 (Q2), 316 (Q3), and 320 (Q4) on the primary side of the transformer 302 (T1). Each of the switches may be an IBGT, MOSFET, or an SCR switch. A first inductor 322 (L1) may be provided and may be in series with each of the switches. A primary side transformer winding 326 is provided, along with an AC source 324 (Uac). On the secondary side of the transformer 302 (T1) may be provided bi-directional switch 352 (Qr1), bi-directional switch 354 (Qr2), bi-directional switch 356 (Qr3), and bi-directional switch 360 (Qr4). A DC source may be provided 350 (Udc), along with transformer winding 362. An analysis by stages is listed in the waveform diagram of FIG. 15.

Figure 16:
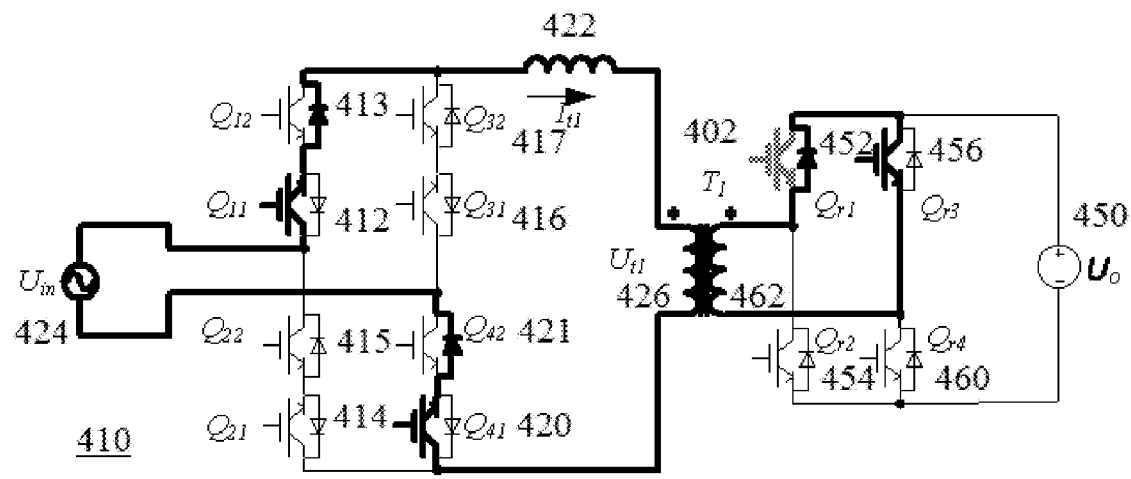
FIG. 16 illustrates current movement at a first time in the AC-DC converter according to one or more embodiments of the illustrated circuit.

In a circuit similar to circuit 310 illustrated in FIG. 14, bi-directional switches are provided in the circuit 410 illustrated in FIG. 16. The one or more circuits 410 may include switches 412 (Q11), 413 (Q12), 414 (Q21), 415 (Q22), 416 (Q31), 417 (Q32), 420 (Q41), and 421 (Q42) on the primary side of the transformer 402 (T1). Each of the switches may be an IBGT, MOSFET, or an SCR switch. A first inductor 422 (L1) may be provided and may be in series with each of the switches. A primary side transformer winding 426 is provided, along with an AC source 424 (Uac). On the secondary side of the transformer 402 (T1) may be provided bi-directional switch 452 (Qr1), bi-directional switch 454 (Qr2), bi-directional switch 456 (Qr3), and bi-directional switch 460 (Qr4). A current source may be provided 450 (U0), along with transformer winding 462.

Timing and operation of the one or more circuit diagrams disclosed in FIG. 16 in rectifier mode is illustrated in FIGS. 16 through 19 in which each successive figure represents a successive time period and the bolded portion of the circuit indicates current flow. As illustrated in the stage of FIG. 16, input voltage is applied to the inductor 422 (L1). The secondary side of the transformer 402 (T1) is short-circuited. The current increases from zero, and switch 412 (Q11) and switch 420 (Q41) ZCS turn on.

Figure 17:
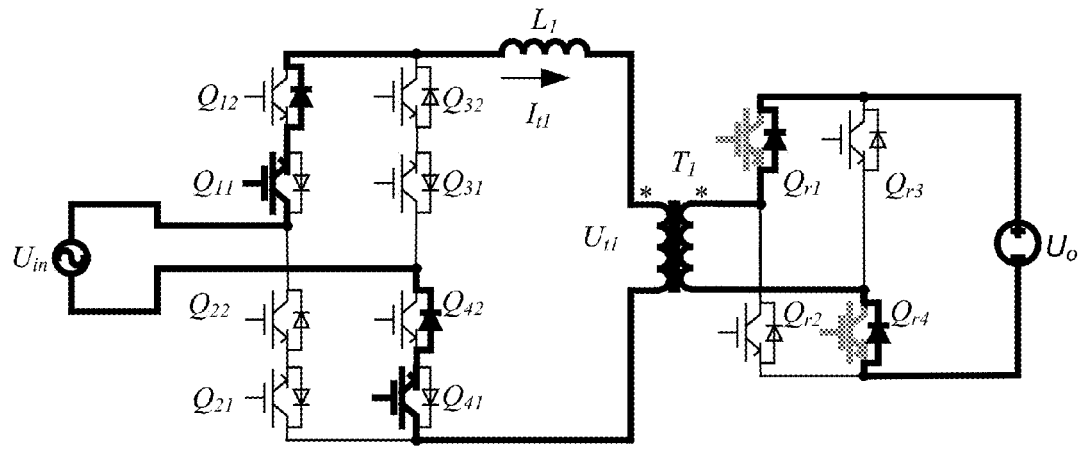
FIG. 17 illustrates current movement at a second time in the AC-DC converter according to one or more embodiments illustrated in FIG. 16.

As illustrated in the stage of FIG. 17, switch 456 (Qr3) turns off, and this may be a hard switch. Switch 460 (Qr4) is turned on with ZVS. The input voltage and output voltage are applied to inductor 422 (L1) together. The current decreases to zero. The magnetizing current increases.

Figure 18:
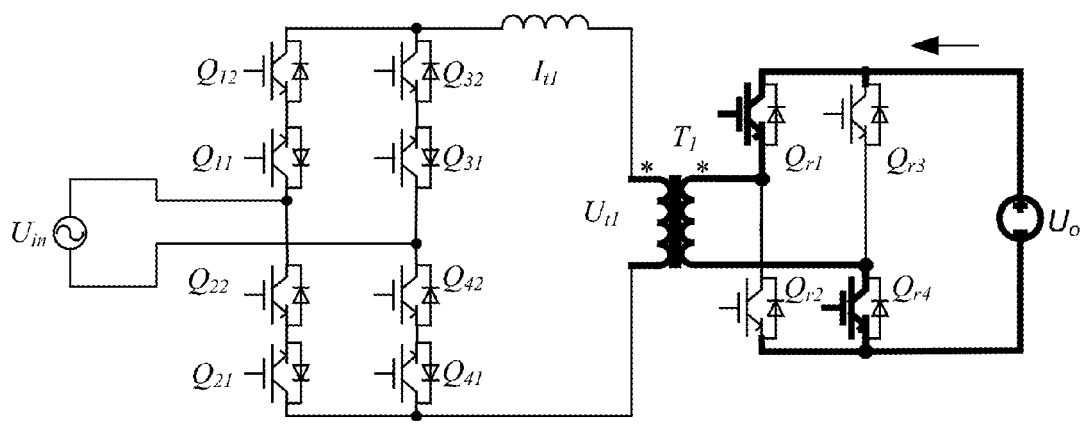
FIG. 18 illustrates current movement at a third time in the AC-DC converter according to one or more embodiments illustrated in FIG. 16.

As illustrated in the stage of FIG. 18, the current It1 is zero and the magnetizing current is provided by Uo and passes through first switch 452 (Qr1) and switch 460 (Qr4).

Figure 19:
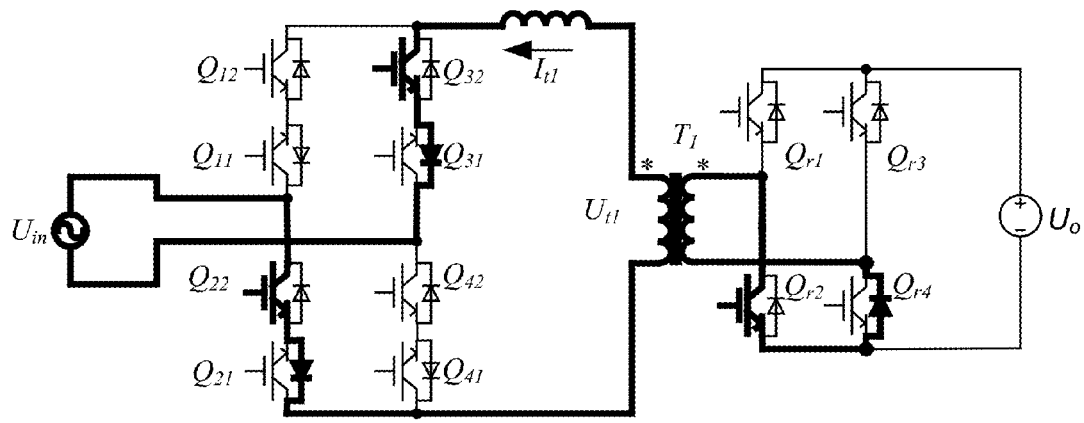
FIG. 19 illustrates current movement at a fourth time in the AC-DC converter according to one or more embodiments illustrated in FIG. 16.

As illustrated in the stage of FIG. 19, switch 412 (Q11), switch 420 (Q41), and switch 452 (Qr1) are turned off. After a predetermined period of time, switch 415 (Q22), switch 417 (Q32), and switch 454 (Qr2) are turned on. During the predetermined period of time, switch 454 (Qr2) ZVS turns on. Switch 415 (Q22) and switch 417 (Q32) turn on with ZCS.

Figure 20:
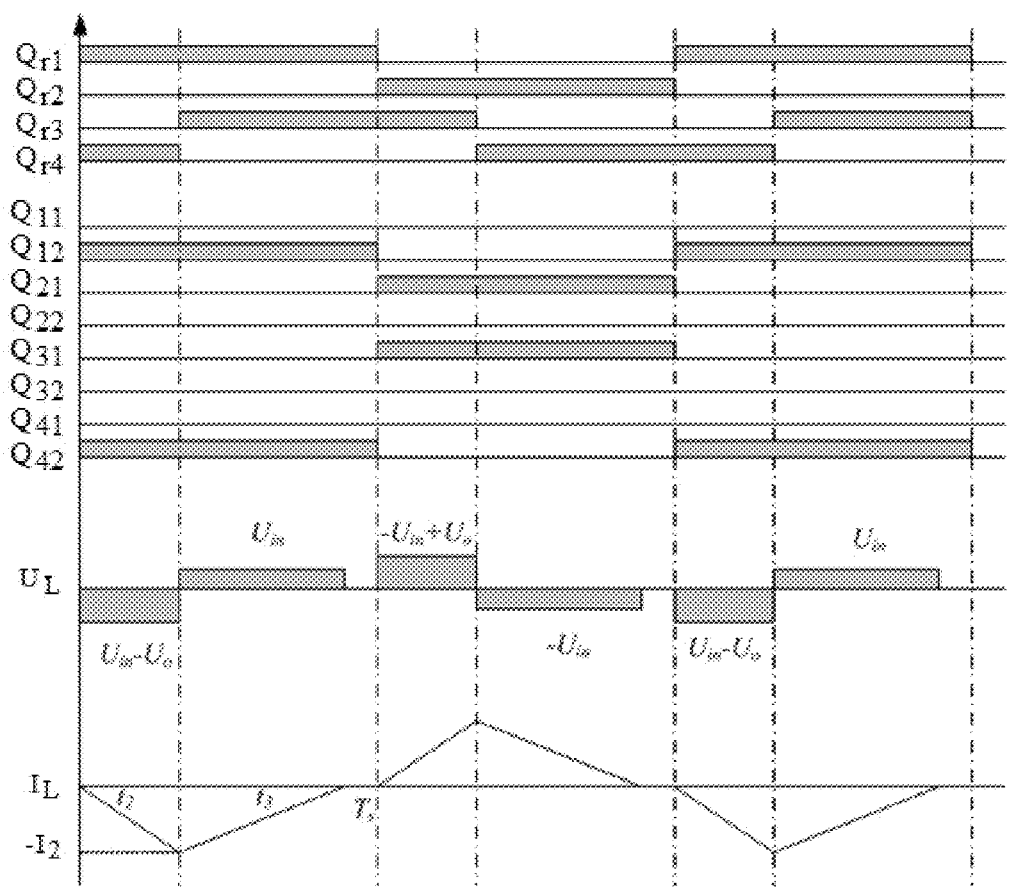
FIG. 20 is a chart illustrating the waveform characteristics of the AC-DC converter according to one or more embodiments illustrated in FIG. 16.

Timing and operation of the one or more circuit diagrams disclosed in FIG. 16 in inverter mode is illustrated in FIG. 20.

The one or more transformer isolated soft switched single-stage AC-DC converters disclosed herein are more compact than conventional AC-DC-DC converters with a PWM rectifier stage and isolation transformer because there is no DC-link capacitor bank, a fewer number of semiconductor switches, and smaller heat sinks. In the one or more converters disclosed herein, the semiconductor power devices are switched at soft conditions in the full load range which greatly reduces the switching loss and improves the converter efficiency compared to conventional hard-switched PWM rectifier. Due to the resonance operation of the circuit, di/dt and AC point of connection, dv/dt are significantly reduced as well as electromagnetic interference (EMI). Higher switching frequency can be selected due to the soft switching and then a smaller input filter can be used. The input current harmonic may be very low (<2%). The galvanic isolation and high voltage gain can be obtained by the integrated high frequency transformer in the converter.

The one or more converters disclosed herein have many commercial applications. For example, the one or more converters can be used in most of the applications where the conventional PWM AC-DC converters are used. Additionally, the one or more converters may be advantageous in applications which require galvanic isolation or high voltage gain. One typical application may be the PHEV (plug-in hybrid electric vehicle) or EV (electric vehicle) onboard battery pack charger. The charger is mounted on the vehicle and high power density is required. The one or more converters disclosed herein utilize a high frequency transformer that provides more safe galvanic isolation between the grid and vehicle and may accommodate any voltage difference between the pack terminal voltage and grid voltage. The low power loss associated with the one or more embodiments disclosed herein provide for efficient energy transfer for both charging and discharging vehicle-to-grid (V2G) mode of the battery.

Additionally, the one or more converters disclosed herein may be appropriately configured for use as one or more solid state transformers. The efficiency of the one or more solid state transformers will be increased compared to the traditional topology used for solid state transformer applications and may be close to the very high efficient line frequency transformer. Additionally, the volume and weight of the transformer will be much lower since it operates at high frequency. In addition the high dv/dt and di/dt issues which are typically severe in high voltage and high frequency converters will be greatly mitigated.

In one or more embodiments, higher voltage rating devices or series connection of devices may be employed for the semiconductor power switches. This disadvantage can be solved by back-to-back connection of two IGCTs or MOSFETs and package them together in mass production.

In one or more embodiments, there are multiple approaches to control the power or input current include the turn-off instant of switches, phase-shift modulation of a secondary full bridge, and switching frequency. Additionally, power can be transferred to the secondary side during the extremely low input voltage period of an AC cycle.

In each operating cycle of the rectifier mode of the one or more circuits provided herein, the first switch conducts in the first half cycle and a half-cycle series resonance is performed. At the end of the resonance, the energy is transferred from AC input to the resonant capacitor and the input switch is turned off with zero current which eliminates the switch turn-off loss. Then the second switch of the basic structure conducts in the second half cycle. With the coordination of semiconductor switches in the output stage, the other half-cycle series resonance is performed, which transfer the energy stored in the resonant capacitor to the DC output. At the end of the resonance, the second switch is turned off with zero current. Similar resonance operation may occur in the inverter mode, however, the second switch conducts firstly and the first switch conducts in the second half cycle in inverter mode operation. Zero current switching is obtained for the two switches as well which eliminates turn-off loss.

In one embodiment of the power flow control methods, the phase-shift modulation is applied to the output full bridge such that the initial capacitor voltage of resonant capacitor can be controlled and so is the magnitude of the power flow.

In another embodiment of the power flow control methods, the switching frequency is adjusted such that the frequency of transfer energy from input to output or from output to input is controlled as is the magnitude of the power flow.

In another embodiment of the power converters disclosed herein, bidirectional four-quadrant semiconductor power switches can be replaced by voltage bi-directional two-quadrant semiconductor power switches for uni-directional power conversion applications.

In another embodiment of the power converters disclosed herein, both input and output are DC and the invented converter can be used as DC-DC converter. In another embodiment of the power converters disclosed herein, both input and output are AC and the invented converter can be used as AC-AC converter. In another embodiment of the power converters disclosed herein, the input of three AC-DC converters are connected to three-phase AC input and the output are parallel connected and it can be used as three-phase AC-DC converter.

Features from one embodiment or aspect may be combined with features from any other embodiment or aspect in any appropriate combination. For example, any individual or collective features of method aspects or embodiments may be applied to apparatus, system, product, or component aspects of embodiments and vice versa.

While the embodiments have been described in connection with the preferred embodiments of the various figures, it is to be understood that other similar embodiments may be used or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed:

1. An alternating current-to-direct current (AC-DC) converter comprising:
   a transformer having a primary side and a secondary side;
   a first bi-directional switch and a first inductor connected in series between a positive terminal of an AC source and a first terminal of the primary side of the transformer;
   a second bi-directional switch and a second inductor connected between the positive terminal of the AC source and a second terminal of the primary side of the transformer and connected in parallel with the first bi-directional switch;
   a first active switch connected between a first terminal of the secondary side of the transformer and a first terminal of a DC load;
   a second active switch connected between the first terminal of the secondary side of the transformer and a second terminal of the DC load;
   a third active switch connected between a second terminal of the secondary side of the transformer and the first terminal of the DC load; and
   a fourth active switch connected between second terminal of the secondary side of the transformer and the second terminal of the DC load, and
   wherein the third and fourth active switches are configured to alternatively turn on and off in a first predetermined sequence to regulate one of current and voltage on the primary side of the transformer,
   wherein the first and second bi-directional switches are configured to alternatively turn on and off in a second predetermined sequence,
   wherein when the third active switch is turned on, one of the first active switch and the second active switch is turned on, and one of the first bi-directional switch and second bi-directional switch is turned on, allowing a first current flow through one of the first inductor and second inductor, and
   wherein when the fourth active switch is turned on, one of the first active switch and the second active switch is turned on, and one of the first bi-directional switch and second bi-directional switch is turned on, allowing a second current flow through one of the first inductor and second inductor.

2. The converter of claim 1, wherein the first bi-directional switch and the second bi-directional switch are insulated-gate bipolar transistor (IGBT) switches.

3. The converter of claim 1, wherein the first bi-directional switch and the second bi-directional switch are metal-oxide semiconductor field-effect transistors (MOSFETS).

4. The converter of claim 1, wherein the first bi-directional switch and the second bi-directional switch are silicon-controlled rectifier switches (SCR).

5. The converter of claim 1, wherein the transformer is a high frequency transformer.

6. The converter of claim 1, wherein the transformer primary winding comprises one of a center-tapped winding or two separate windings.

7. The converter of claim 1, further comprising a third bi-directional switch connected in series with the first bi-directional switch and the first inductor.

8. The converter of claim 1, further comprising a fourth bi-directional switch connected in series with the second bi-directional switch and the second inductor.

9. The converter of claim 1, wherein current is regulated on the primary side and voltage is regulated on the secondary side of the transformer.

10. The converter of claim 1, wherein, when the first and second bi-directional switches of the primary side turn on, current flowing therethrough increases from zero, and when the first and second two bi-directional switches of the primary side turn off, the current has been decreased to zero.

11. A method of transmission in a bi-directional AC-DC converter having a bi-directional power stage that processes energy from an AC utility power grid to a passive DC load, the power stage including a first bi-directional switch and a second bi-directional switch on a primary side of a transformer, comprising the steps of:
    providing a first active switch connected between a first terminal of a secondary side of the transformer and a first terminal of a DC load;
    providing a second active switch connected between the first terminal of the secondary side of the transformer and a second terminal of the DC load;
    providing a third active switch connected between a second terminal of the secondary side of the transformer and the first terminal of the DC load;
    providing a fourth active switch connected between second terminal of the secondary side of the transformer and the second terminal of the DC load; and
    controlling the third and fourth active switches to alternatively turn on and off in a first predetermined sequence to regulate one of current and voltage on the primary side of the transformer,
    wherein the first and second bi-directional switches are configured to alternatively turn on and off in a second predetermined sequence,
    wherein when the third active switch is turned on, one of the first active switch and the second active switch is turned on, and one of the first bi-directional switch and second bi-directional switch is turned on, allowing a first current flow through one of the first inductor and second inductor, and
    wherein when the fourth active switch is turned on, one of the first active switch and the second active switch is turned on, and one of the first bi-directional switch and second bi-directional switch is turned on, allowing a second current flow through one of the first inductor and second inductor.

12. The method of claim 11, wherein the power stage further includes:
    a third bi-directional switch connected in series with the first bi-directional switch and a first inductor; and
    a fourth bi-directional switch connected in series with the second bi-directional switch and a second inductor.

13. A bi-directional alternating current-to-direct current (AC-DC) converter comprising a bi-directional power stage that processes energy from an AC utility power grid to a passive DC load, the power stage comprising:
    an input filter inductor and at least two bi-directional switches on a primary side of a transformer;
    a first active switch connected between a first terminal of the secondary side of the transformer and a first terminal of a DC load;
    a second active switch connected between the first terminal of the secondary side of the transformer and a second terminal of the DC load;
    a third active switch connected between a second terminal of the secondary side of the transformer and the first terminal of the DC load; and
    a fourth active switch connected between second terminal of the secondary side of the transformer and the second terminal of the DC load, and wherein the third and fourth active switches are configured to alternatively turn on and off in a first predetermined sequence to regulate one of current and voltage on the primary side of the transformer, wherein the first and second bi-directional switches are configured to alternatively turn on and off in a second predetermined sequence, wherein when the third active switch is turned on, one of the first active switch and the second active switch is turned on, and one of the first bi-directional switch and second bi-directional switch is turned on, allowing a first current flow through one of the first inductor and second inductor, and wherein when the fourth active switch is turned on, one of the first active switch and the second active switch is turned on, and one of the first bi-directional switch and second bi-directional switch is turned on, allowing a second current flow through one of the first inductor and second inductor.

14. The bi-directional AC-DC converter of claim 13, wherein each of the at least two bi-directional switches comprise at least one of an insulated-gate bipolar transistor (IGBT), MOSFET, and SCR.

15. The bi-directional AC-DC converter of claim 13, wherein the input filter inductor is configured to utilize the transformer leakage.

16. The bi-directional AC-DC converter of claim 13, wherein each of the at least two bi-directional switches on the secondary side of the transformer comprise at least one of a metal-oxide-semiconductor field-effect transistor (MOSFET), IGBT, and SCR.

17. The bi-directional AC-DC converter of claim 13, wherein, when the at least two bi-directional switches of the primary side turn on, current flowing therethrough increases from zero, and when the at least two bi-directional switches of the primary side turn off, the current has been decreased to zero.

18. The method of claim 11, further comprising processing energy from a DC source to the AC utility grid.

* * * * *

UNITED STATES PATENT AND TRADEMARK OFFICE
CERTIFICATE OF CORRECTION

PATENT NO. : 8,861,238 B2
APPLICATION NO. : 13/595883
DATED : October 14, 2014
INVENTOR(S) : Qin Huang et al.

It is certified that error appears in the above-identified patent and that said Letters Patent is hereby corrected as shown below:

In The Specification

Replace the paragraph beginning at column 1, line 14, with the following amended paragraph:
"The invention disclosed herein was made with government support under award number EEC-08212121 awarded by the ERC Program of the National Science Foundation. The government has certain rights in the invention."

Signed and Sealed this
Fifth Day of January, 2016

Michelle K. Lee
*Director of the United States Patent and Trademark Office*